United States Patent
Ban

(10) Patent No.: US 8,270,027 B2
(45) Date of Patent: Sep. 18, 2012

(54) IMAGE FORMING APPARATUS CAPABLE OF CONFIGURING PRINT SETTINGS WHICH HAVE LESS INFLUENCE ON THE ENVIRONMENT, AND METHOD AND PROGRAM EMBODIED IN A COMPUTER READABLE RECORDING MEDIUM FOR CONFIGURING PRINT SETTINGS

(75) Inventor: Shinichi Ban, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1516 days.

(21) Appl. No.: 11/797,120

(22) Filed: May 1, 2007

(65) Prior Publication Data
US 2008/0037058 A1   Feb. 14, 2008

(30) Foreign Application Priority Data
Aug. 10, 2006   (JP) .................................. 2006-218869

(51) Int. Cl.
G06F 3/12 (2006.01)
G06F 15/00 (2006.01)
B41J 2/315 (2006.01)
B41J 2/385 (2006.01)
G03G 15/08 (2006.01)
G03G 15/00 (2006.01)

(52) U.S. Cl. .. 358/1.9; 358/1.15; 358/1.13; 400/120.09; 399/27; 399/81; 347/131

(58) Field of Classification Search .................. 358/1.15, 358/1.9, 1.13; 400/120.09; 399/27, 81; 347/131
See application file for complete search history.

(56) References Cited

U.S. PATENT DOCUMENTS

| | | | | |
|---|---|---|---|---|
| 5,455,686 A | * | 10/1995 | Nagano et al. | 358/404 |
| 5,745,255 A | * | 4/1998 | Yamaguchi | 358/1.15 |
| 5,751,433 A | * | 5/1998 | Narendranath et al. | 358/1.9 |
| 5,797,061 A | * | 8/1998 | Overall et al. | 399/27 |
| 5,802,420 A | * | 9/1998 | Garr et al. | 399/27 |
| 5,902,054 A | * | 5/1999 | Coudray | 400/120.09 |
| 5,930,006 A | * | 7/1999 | Yoshida et al. | 358/450 |
| 6,064,836 A | | 5/2000 | Nakamura et al. | |
| 6,266,153 B1 | * | 7/2001 | Davidson et al. | 358/1.9 |
| 6,324,356 B1 | * | 11/2001 | Inoue | 399/39 |
| 6,478,233 B1 | * | 11/2002 | Shah | 236/46 R |

(Continued)

FOREIGN PATENT DOCUMENTS

JP   10-031400   2/1998

(Continued)

OTHER PUBLICATIONS

Japanese Office Action mailed on Jul. 22, 2008 directed at counterpart foreign application JP-2006-218869; 7 pages.

*Primary Examiner* — Akwasi M Sarpong
(74) *Attorney, Agent, or Firm* — Morrison & Foerster LLP

(57) ABSTRACT

To configure print settings which have less influence on the environment, an MFP includes a document reader to receive image data, a print setting receiving portion to receive print settings to make printouts of the data, an environmental load calculating portion to calculate an environmental load which indicates a degree of influence on the environment based on the received print settings, and an alerting portion to display the calculated environmental load.

9 Claims, 12 Drawing Sheets

U.S. PATENT DOCUMENTS

| | | | | |
|---|---|---|---|---|
| 6,628,904 | B2 * | 9/2003 | Yamada | 399/27 |
| 6,738,587 | B1 * | 5/2004 | Hoene et al. | 399/77 |
| 6,816,179 | B2 * | 11/2004 | Hanyu | 347/131 |
| 6,982,804 | B2 * | 1/2006 | Frolik et al. | 358/1.15 |
| 7,062,190 | B2 * | 6/2006 | Miyamoto | 399/81 |
| 7,340,193 | B2 * | 3/2008 | Tajima | 399/69 |
| 7,692,834 | B2 * | 4/2010 | Matsuzaki | 358/528 |
| 7,715,029 | B2 * | 5/2010 | Kayahara | 358/1.13 |
| 7,738,800 | B2 * | 6/2010 | Yamada | 399/27 |
| 7,743,000 | B2 * | 6/2010 | Allen et al. | 705/400 |
| 7,952,749 | B2 * | 5/2011 | Chiba | 358/1.2 |
| 2002/0198792 | A1 * | 12/2002 | Ban | 705/26 |
| 2003/0126316 | A1 * | 7/2003 | Parker | 710/15 |
| 2005/0094193 | A1 * | 5/2005 | Oswald | 358/1.15 |
| 2007/0277087 | A1 * | 11/2007 | Matsuda | 715/500 |

FOREIGN PATENT DOCUMENTS

| | | |
|---|---|---|
| JP | 2003-150695 | 5/2003 |

* cited by examiner

F I G. 4

[PAPER TYPE]

| NORMAL PAPER | | RECYCLED PAPER | |
|---|---|---|---|
| A4 | 5 | A4 | 10 |
| A3 | 10 | A3 | 20 |
| B4 | 7.5 | B4 | 15 |
| B5 | 3.5 | B5 | 7.5 |

[COLOR/MONOCHROME]

| COLOR | 2 |
| MONOCHROME | 1 |
| COLOR (SAVE TONER) | 1 |
| MONOCHROME (SAVE TONER) | 0.5 |

[STAPLE]

| STAPLE | 5 |
| NO STAPLE | 0 |

[DUPLEX/SIMPLEX]

| DUPLEX | 2 |
| SIMPLEX | 1 |

[CLASSIFIED DOCUMENT]

| CLASSIFIED DOCUMENT | 50 |

[RECYCLE]

| NO RECYCLE | 100 |

CANCEL    OK

FIG. 5

| FIELD | ORIGINAL SETTING | SUBSTITUTE SETTING | REDUCTION | DIFFERENCE FROM TARGET REDUCTION |
|---|---|---|---|---|
| PAPER TYPE | A4 NORMAL PAPER | A4 NORMAL PAPER | 0 | 2.9 |
| | | A3 NORMAL PAPER | +5 | 7.9 |
| | | B4 NORMAL PAPER | +2.5 | 5.4 |
| | | B5 NORMAL PAPER | -1.5 | 1.4 |
| | | A4 RECYCLED PAPER | +5 | 7.9 |
| | | A3 RECYCLED PAPER | +15 | 17.9 |
| | | B4 RECYCLED PAPER | +10 | 12.9 |
| | | B5 RECYCLED PAPER | +2.5 | 5.4 |
| COLOR/MONOCHROME | MONOCHROME | COLOR | +1 | 3.9 |
| | | COLOR (SAVE TONER) | 0 | 2.9 |
| | | MONOCHROME | 0 | 2.9 |
| | | MONOCHROME (SAVE TONER) | -0.5 | 2.4 |
| DUPLEX/SIMPLEX | DUPLEX | DUPLEX | 0 | 2.9 |
| | | SIMPLEX | -1 | 1.9 |
| STAPLE | OFF | ON | +5 | 7.9 |
| | | OFF | 0 | 2.9 |

F I G. 1 1
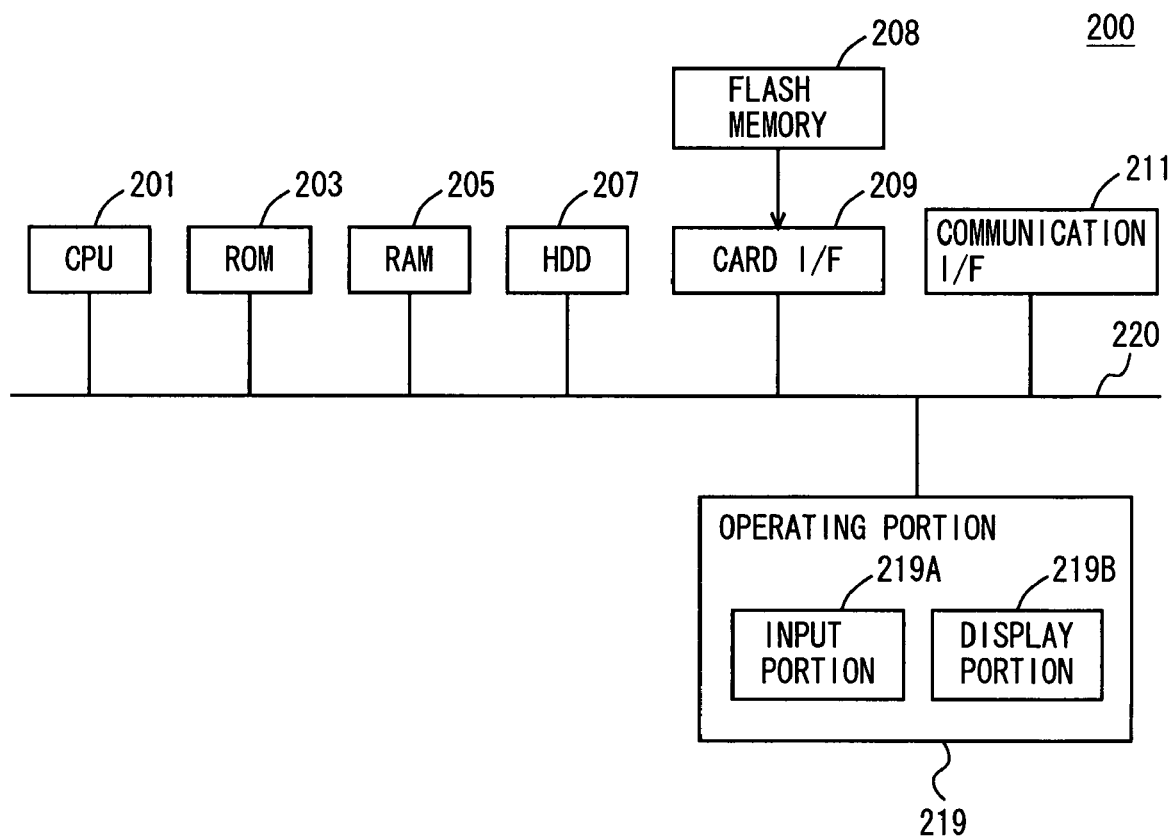

FIG. 12

| PRINT SETTINGS | ? X |
|---|---|
| SETUP \| PAGE SETUP \| FORM \| WATERMARK \| PRINT QUALITY \| FONT \| FAX \| VERSION | |

PAPER
- ORIENTATION: ● PORTRAIT  ○ LANDSCAPE
- SIZE OF ORIGINAL DOCUMENT: A4
- SIZE OF PRINT: SAME AS ORIGINAL
- ZOOM
- PAPER TRAY: AUTO
- SET PAPER TYPE

BOOKBIND
- BINDING POSITION: AUTO
- SIDE: DUPLEX
- ☐ PAGE LAYOUT
- ☐ MARGIN
- ☐ STAPLE
- ☐ PUNCH

COPIES
- SELECT PRINT: ☐ NORMAL PRINT
- NUMBER OF COPIES: 1 (1-999)
- DISCHARGE TRAY: DEFAULT

SAVE/RETRIEVE SETTINGS
VIEW: ● MEDIA  ○ ORIGINAL
A4 (210x297mm)

☑ SORT   ☐ COLLATE
☐ REJECT WHITE PAPER   ☐ NO RECYCLE
AUTHENTICATION/DEPARTMENT CONTROL

ENVIRONMENTAL LOAD: 28%
RETURN TO DEFAULT

[HELP] [APPLY] [CANCEL] [OK]

IMAGE FORMING APPARATUS CAPABLE OF CONFIGURING PRINT SETTINGS WHICH HAVE LESS INFLUENCE ON THE ENVIRONMENT, AND METHOD AND PROGRAM EMBODIED IN A COMPUTER READABLE RECORDING MEDIUM FOR CONFIGURING PRINT SETTINGS

This application is based on Japanese Patent Application No. 2006-218869 filed with Japan Patent Office on Aug. 10, 2006, the entire content of which is hereby incorporated by reference.

BACKGROUND OF THE INVENTION

1. Field of the Invention

The present invention relates to an image forming apparatus, and a method and program embodied in a computer readable recording medium for configuring print settings. More particularly, the present invention relates to an image processing apparatus, method and program embodied in a computer readable recording medium capable of configuring print settings which have less influence on the environment.

2. Description of the Related Art

Recently, the environmental protection movements have been promoted and, as part of such movements in the industrial field, there has been a need for the effective use of resources such as paper and toner consumed in image forming apparatuses. Japanese Patent Laid-Open Publication No. H10-31400 discloses a method for managing image formation, wherein the number of times of copying is restricted to not exceed an upper limit preset for each department to which the user of the copier belongs to. By restricting the times of copying, the consumption of resources is maintained within the upper limit.

There is a case, however, where the necessary number of documents may not be prepared because the number of times of copying is restricted. Therefore, it is desired to minimize the environmental influence without restricting the times of copying. On the other hand, the recycling system of paper resource seems to have been almost established, but recycling the paper may also affect the environment. Therefore, in addition to minimize the environmental influence caused by consuming the resources such as paper and toner, it is also desired to minimize the environmental influence attributable to recycling the paper with images formed thereon.

SUMMARY OF THE INVENTION

The present invention has been made to solve the problem set forth above, and one object of the present invention is to provide an image forming apparatus capable of configuring print settings which have less influence on the environment.

Another object of the present invention is to provide a method for configuring print settings capable of configuring print settings which have less influence on the environment.

Another object of the present invention is to provide a program embodied in a computer readable recording medium capable of configuring print settings which have less influence on the environment.

To achieve the above objects, according to one aspect of the present invention, an image forming apparatus includes a print settings receiving portion to receive print settings to make printouts of data, an environmental load calculating portion to calculate an environmental load which indicates a degree of influence on the environment based on the received print settings, and a displaying portion to display the calculated environmental load.

In this aspect, the print settings to make printouts of data are received, the environmental load indicating a degree of influence on the environment is calculated according to the received print settings, and the calculated environmental load is displayed. The environmental load is, for example, the amount of $CO_2$ which is generated during recycling of paper. By presenting the environmental load to the user, it is possible to let the user understand how much environmental influence might be caused from the paper with images formed thereon, and urge the user to set up environmentally less influential printing features. As a result, an image forming apparatus capable of configuring the print settings which have less influence on the environment can be provided.

According to another aspect of the present invention, a method for configuring print settings includes the steps of receiving print settings to make printouts of data, calculating an environmental load which indicates a degree of influence on the environment according to the received print settings, and displaying the calculated environmental load.

In this aspect, a method for configuring print settings capable of configuring environmentally less influential print settings can be provided.

According to still another aspect of the present invention, a program embodied in a computer readable recording medium causes a computer to execute the steps of receiving print settings to make printouts of data, calculating an environmental load which indicates a degree of influence on the environment according to the received print settings, and displaying the calculated environmental load.

In this aspect, a program product capable of configuring environmentally less influential print settings can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an example of an input screen for entering reference data;

FIG. 5 is an example of a modification table;

FIG. 11 is a block diagram illustrating an example of a hardware structure of a PC;

FIG. 12 is an example of a setup screen for configuring print settings which is displayed on a display portion of the PC.

DESCRIPTION OF THE PREFERRED EMBODIMENTS

Figure 1:
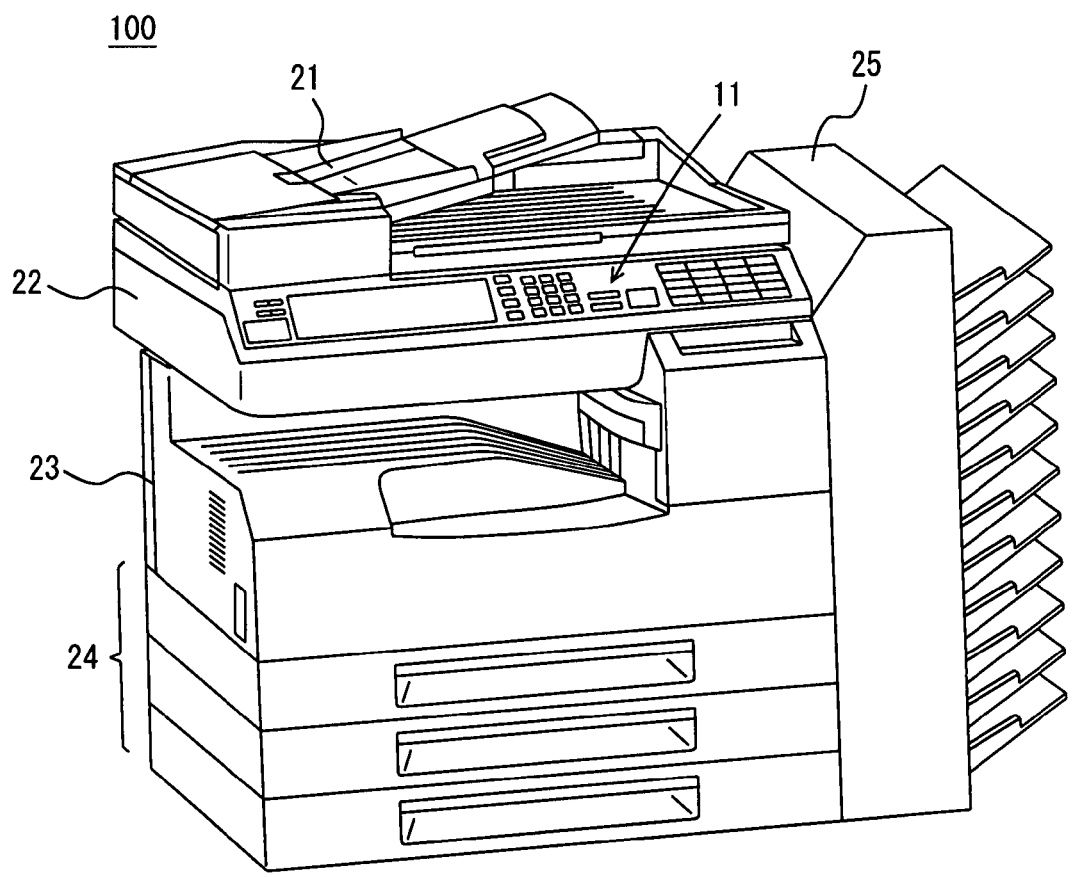
FIG. 1 is a perspective view showing an appearance of a MFP.

The preferred embodiments of the present invention will be described below with reference to the accompanying drawings. In the drawings, like numerals indicate similar elements which are designated the same way and perform the same function, and the detailed description thereof will not be repeated.

First Embodiment

Referring to FIG. 1, there is shown a perspective view of an MFP (Multi Function Peripheral) according to an embodiment of the present invention. As show in FIG. 1, an MFP 100 includes an ADF (automatic document feeder) 21, a document reader 22, an image forming portion 23, a paper supply portion 24, and a postprocessing portion 25. ADF 21 handles a plurality of documents mounted on a document tray to transport the documents one after another to document reader 22. Document reader 22 optically reads information of the image, including pictures, letters, drawings, and so on, to acquire image data. When the image data is input to image forming portion 23, it renders image on a sheet of paper according to the image data. Image forming portion 23 renders image using four toner colors, including cyan, magenta, yellow and black. Paper supply portion 24 stores a stock of sheets of paper and supplies them one sheet after another to image forming portion 23. Post-processing portion 25 discharges the sheets of paper after images are formed thereon. Several discharging trays are provided in post-processing portion 25 to allow the sheets of paper to be sorted before discharging. Post-processing portion 25 also includes a punching and stapling portion to punch and/or staple the discharged sheets. MFP 100 further includes a control panel 11 which serve as a user interface operable by a user.

Figure 2:
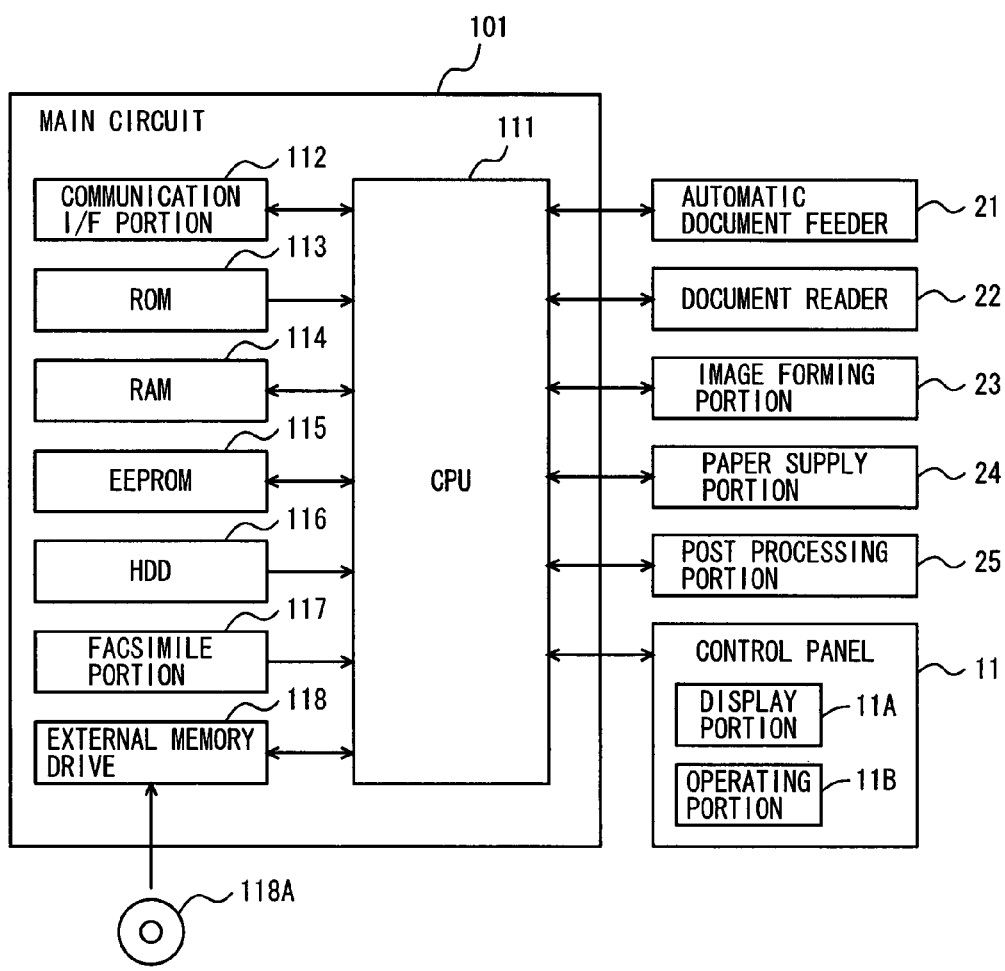
FIG. 2 is a block diagram illustrating an example of a hardware structure of the MFP.

FIG. 2 is a block diagram of an exemplary hardware structure of the MFP. As shown in FIG. 2, MFP 100 includes a main circuit 101, document reader 22 for reading documents, ADF 21 for transporting documents to document reader 22, image forming portion 23 for forming an image on, for example, a sheet of paper according to the image data supplied from document reader 22 by reading the documents, paper supply portion 24 for supplying sheets of paper to image forming portion 23, and control panel 11 used as a user interface. Main circuit 101 includes a central processing unit (CPU) 111, a communication interface (I/F) portion 112, a read only memory (ROM) 113, a random access memory (RAM) 114, an electronically erasable and programmable ROM (EEPROM) 115, a hard disc drive (HDD) 116 serving as a large capacity memory, a facsimile portion 117, and an external memory drive 118 to which a CD-ROM (Compact Disc-ROM) 118A is mounted. CPU 111 is connected to ADF 21, document reader 22, image forming portion 23, paper supply portion 24, post-processing portion 25 and control panel 11, in order to control the entire MFP 100

Control panel 11 includes a display portion 11A and an operating portion 11B. Display portion 11A is implemented by a display device such as a liquid crystal display (LCD) and an organic electroluminescence display (EL), and displays a menu of instructions or the information of acquired image data toward users. Operating portion 11B includes a plurality of keys for entering data including various instructions, letters and numerals by manipulating individual keys by the user. Operating portion 11B also includes a touch panel provided on display portion 11A.

ROM 113 stores a program to be executed by CPU 111, or data necessary to execute the program. RAM 114 is used as a working area when CPU 111 executes the program. RAM 114 also temporally stores the data (image data) sent sequentially from document reader 22.

Communication I/F portion 112 is a communication interface which connects MFP 100 with a network. CPU 111 establishes communication with other MFPs or computers to send/transmit data via communication I/F portion 112.

Facsimile portion 117 is connected to the public switched telephone network (PSTN) and transmits and/or receives facsimile data to and from PSTN. Facsimile portion 117 stores the received facsimile data in HDD 116, or supplies it to image forming portion 23 which, in turn, makes printouts of the facsimile data received from facsimile portion 117 on the sheets of paper. Alternatively, facsimile portion 117 may convert the data stored in HDD 116 into facsimile data and sends it to a fax machine connected to PSTN.

A CD-ROM 118A is mounted on external memory drive 118. CPU 111 is accessible to CD-ROM 118A through external memory drive 118. Here, CPU 111 executes the program stored in ROM 113, but the program stored in CD-ROM 118A may be loaded to RAM 114 and executed.

Figure 3:
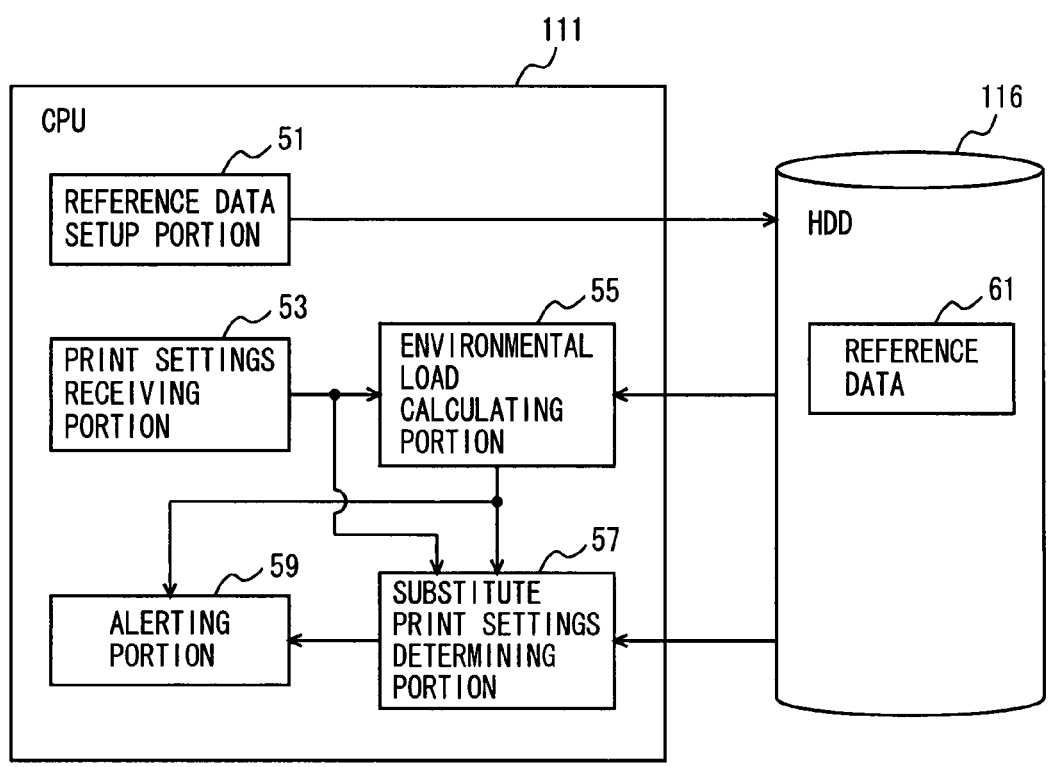
FIG. 3 is a functional block diagram illustrating an overall function of a CPU together with data stored in a HDD.

FIG. 3 is a functional block diagram illustrating an overall function of CPU and the data stored in the HDD. As shown in FIG. 3, CPU 111 includes a reference data setup portion 51 which receives reference data and stores it in HDD 116, a print settings receiving portion 53 which receives print settings, an environmental load calculating portion 55 which calculates an environmental load based on the received print settings, a substitute print settings determining portion 57 which determines alternative print settings replacing the received print settings, and an alerting portion 59 which informs about the substitute print settings.

Reference data setup portion 51 presents a reference data input screen for entering reference data on display portion 11A, and receives reference data from the user who enters it into operating portion 11B by following the instructions on the reference data input screen. The reference data defines coefficients, each for a plurality of setting values which may be set in a plurality of setting fields of the print settings. In this embodiment, the print settings include paper type, color/monochrome printing, simplex/duplex printing, and stapling. In the field of paper type, a total of eight settings, consisting of four settings including A4, A3, B4, and B5 size normal paper, and another four settings including A4, A3, B4, and B5 size recycled paper, can be entered. In the field of color/monochrome printing, four settings including color, monochrome, color with reduced toner (save toner), and monochrome with reduced toner (save toner) can be entered. In the field of simplex/duplex printing, two settings including the simplex setting for printing the image on one side of the paper, and the duplex setting for printing the image on both sides of the paper can be entered. In the filed of stapling, two settings, i.e., with or without stapling, can be entered. To configure the print settings, the settings are entered, one for each field, in the paper type, color/monochrome printing, simplex/duplex printing, and stapling fields. When the settings are fixed, corresponding coefficients will be determined for each field based on the amount of $CO_2$ which is supposed to be generated during recycling of the paper on which the image is formed according to the fixed print settings configured by the settings entered in each field. Namely, the coefficients for each field are determined according to the contribution of the setting in each field to the generation of CO2 during recycling of such paper. Alternatively, the coefficients may be determined in a relative manner between the setting in a particular field and the settings in other fields, or may be provided in percentages indicating the contribution to the generation of CO2 during recycling of the paper. The reference data may be predetermined experimentally and saved during the manufacture of MFP 100. Reference data setting portion 51 stores the received reference data in HDD 116. Thus, reference data 61 is saved in HDD 111.

In the field of paper type, as normal paper is recycled into more useful paper than recycled paper, a smaller coefficient is set for the normal paper setting than the recycled paper setting. In the field of color/monochrome printing, the paper having a color image formed thereon must be processed in a complicated way requiring breeching, as multiple colors of toner are attached to such paper. Therefore, a larger coefficient is set for the color setting than the monochrome setting. In the field of stapling, as the stapled paper must be processed preliminary before recycling to separate staples from the paper, a larger coefficient is set for the staple setting than no staple setting. In the field of duplex/simplex printing, as a greater amount of toner is attached to such paper than the paper having the image formed only on one side thereof, recycling is difficult for the paper having images formed on both sides of the paper. Therefore, a larger coefficient is set for the duplex setting than the simplex setting.

If the paper includes an image which represents classified information, it may cause a large influence on the environment, because such paper will be burned without recycling. Therefore, in the field of classified document, a large coefficient is set for the classified document setting. It is noted that if the classified documents are to be recycled, it is not necessary to define the classified document setting. In the field of recycling, a no recycle setting is used, for example, when the paper with the image formed thereon is to be distributed externally. In this case, a large coefficient is set for the no recycle setting, for it is not apparent whether or not such documents will be recycled.

FIG. 4 is an exemplary reference data input screen. As shown in FIG. 4, the reference data input screen includes spaces to enter the coefficients for possible settings in the paper type, color/monochrome, duplex/simplex, stapling, classified document, and recycling fields, respectively.

Referring back to FIG. 3, reference data receiving portion 53 presents a print settings input screen for entering print settings on display portion 11A, and receives the print settings as well as the classified document and recycling settings from the user who enters them into operating portion 11B by following the instructions on the print settings input screen. In this embodiment, the print settings include the fields of paper type, color/monochrome printing, simplex/duplex printing, and stapling, so that print settings receiving portion 53 receives the settings, each for one field, for the paper type, color/monochrome, simplex/duplex, and stapling fields. The classified document field allows the user to predetermine whether or not the image to be formed on the paper includes classified information, and notify MFP100 of a result. Instead of entering the classified document setting by the user from operating portion 11B following the instructions appearing on the print settings input screen, the classified document field may automatically be set to the classified document setting if a woven pattern and/or watermark, or a particular symbol indicating classified documents is extracted from the image data which is read by and supplied from document reader 22, otherwise no setting will be entered in the classified document field. The recycling field is to predetermine by the user before forming an image whether or not the paper having the image formed thereon should be recycled, and instruct MFP 100 as such. Print settings receiving portion 53 outputs the print settings as well as the classified document and recycling settings to environmental load calculating portion 55. Print settings receiving portion 53 also outputs the print settings to substitute print settings determining portion 57.

Environmental load calculating portion 55 receives the print settings and the classified document and recycling settings from print settings receiving portion 53. If the classified document setting is not designated and the recycling use is designated, environmental load calculating portion 55 calculates an environmental load based on the print settings and reference data 61, and supplies it to substitute print settings determining portion 57 and alerting portion 59. Specifically, environmental load calculating portion 55 reads reference data 61 from HDD 116, and determines an environmental load by summing up the coefficients defined for the paper type, color/monochrome, duplex/simplex, and stapling settings, respectively. In this embodiment, it is assumed that the print settings receiving portion 53 receives the print settings where A4 size normal paper is set in the paper type field, monochrome printing is set in the color/monochrome field, duplex printing is set in the duplex/simplex field, and no stapling is set in the stapling field. When such print settings are received, environmental load calculating portion 55 determines the environmental load by summing up the coefficients, i.e., a coefficient of "5" which is defined in the reference data corresponding to the A4 size normal paper setting, a coefficient of "1" which is defined in the reference data corresponding to the monochrome printing setting, a coefficient of "2" defined in the reference data corresponding to the duplex printing setting, and a coefficient of "0" which is defined in the reference data corresponding to the no staple setting. As a result, the environmental load is 8 in this case.

Alternatively, if the classified document setting is designated, or the recycling use is not designated, environmental load calculating portion 55 calculates the environmental load based on reference data 61 and the classified document setting, or the recycling use setting, and supplies the calculated environmental load to substitute print settings determining portion 57 and alerting portion 59. Specifically, environmental load calculating portion 55 sets the environmental load to "50" which is the coefficient defined in reference data 61 corresponding to the classified document setting in the classified document field. Alternatively, environmental load calculating portion 55 may set the environmental load to "100" which is the coefficient defined in the reference data 61 corresponding to the no recycling use in the recycling field.

When the environmental load is supplied from environmental load calculating portion 55, alerting portion 59 displays it on display portion 11A in a manner that the environmental load is displayed on part of the existing setup screen for configuring print settings currently displayed on display portion 11A. Alerting portion 59 calculates a percentage of the environmental load relative to the reference environmental load and represents it in a graph. The reference environmental load is calculated based on the print settings that may cause the maximum environmental load. Such print settings include A3 recycled paper in the paper type field, color printing in the color/monochrome field, duplex printing in the duplex/simplex field, and stapling in the stapling field. The resulting reference environmental load is 29 which is a total of a coefficient of "20" defined in the reference data corresponding to the setting of A3 recycled paper, a coefficient of "2" defined in the reference data corresponding to the setting of color printing, a coefficient of "2" defined in the reference data corresponding to the setting of duplex printing, and a coefficient of "5" defined in the reference data corresponding to the setting of stapling. Accordingly, alerting portion 59 calculates the percentage of the environmental load of "8" relative to the reference environmental load of "29", which equals to 28%, and makes the graphical representation thereof. As the percentage of the environmental load, instead of the environmental load itself, relative to the maximum environmental load is displayed, it is easier for the user to judge whether or not the given environmental load is high. In addition, the graphical representation, instead of numerical representation, may also facilitate the instinctive judgment by the user as to whether or not the given environmental load is high.

Substitute print settings determining portion 57 determines alternative print settings which replace the print settings supplied from the print settings receiving portion 53, and which may decrease the environmental load. Specifically, substitute print settings determining portion 57 modifies each of the settings respectively in the paper type, color/monochrome printing, duplex/simplex printing, and stapling fields included in the print settings into another setting, and calculates the difference between a reduction in the environmental load to be attained by each of the modified settings and a target reduction, to thereby generate a modification table. The target reduction is calculated from a reduction rate relative to, for example, the reference environmental load (i.e., 29). Here, the reduction rate is set to 10%, so the target reduction is 2.9.

FIG. 5 is an exemplary modification table. The modification table associates original settings with substitute settings for each field, followed by the reduction from the original settings and the difference between the reduction and the target reduction for each substitute setting. In FIG. 5, negative reduction values indicate a decrease in the environmental load, while positive reduction values indicate an increase in the environmental load. For example, if the paper type setting is changed from A4 normal paper to B5 normal paper, the environmental load for the modified setting will be 3.5, making the reduction to 1.5 (i.e., 5−3.5=1.5). If the color/monochrome setting is changed from monochrome to monochrome (save toner) setting, the environmental load for the modified setting will be 0.5, the reduction will be 0.5 (i.e., 1−0.5=0.5). If the duplex/simplex setting is changed from duplex to simplex, the environmental load for the modified setting will be 1 and the reduction will be 1 (i.e., 2−1=1).

Referring back to FIG. 3, substitute print settings determining portion 57 determines the substitute settings in order from having a smaller difference between the reduction and the target reduction, and outputs the determined settings to alerting portion 59. It is noted that the settings having a small difference between the reduction and the target reduction are output, but the settings having the reduction that significantly exceeds the target reduction are not output. The reason for excluding such settings having the reduction significantly exceeding the target reduction is to consider the entire print settings, rather than further reducing the environmental load exceeding the target reduction.

Alternatively, substitute print settings determining portion 57 may choose the settings in order from having smaller reductions until the total reduction reaches the target reduction, and outputs the selected settings to alerting portion 59. Substitute print settings determining portion 57 may also determine the settings having the maximum reduction and outputs them to alerting portion 59.

When the substitute settings are supplied from substitute print settings determining portion 57, alerting portion 59 calculates a reduction rate of the received settings from the reduction of the environmental load and the reference environmental load, and generates a substitute settings presenting screen where the settings and the reductions are aligned in order of receiving to display it on display portion 11A. The substitute settings display screen is popped up in a superimposed manner on the print settings setup screen that has been already displayed on display portion 11A.

Figure 6:
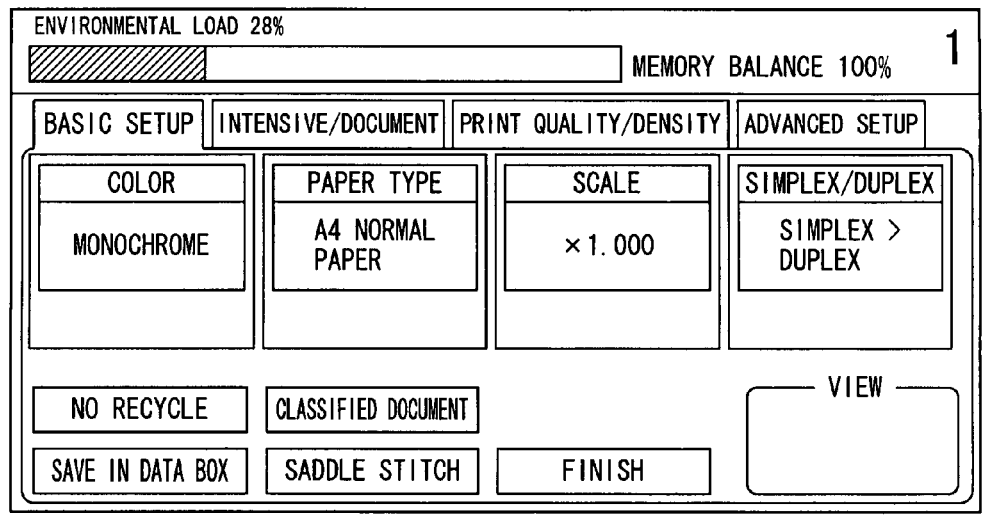
FIG. 6 is an example of a print settings setup screen.

FIG. 6 is an exemplary print settings setup screen. As shown in FIG. 6, the print settings setup screen includes an area for entering print settings and another area arranged on the upper side of the screen for showing a graph which indicates a percentage of the environmental load corresponding to the determined print settings relative to the reference environmental load.

Figure 7:
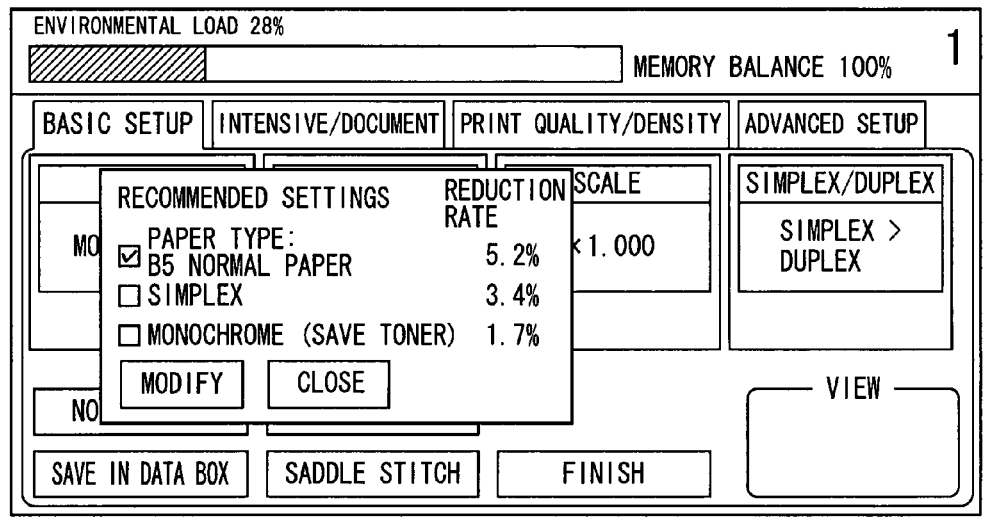
FIG. 7 is an example of a print settings setup screen together with a substitute settings presenting screen.

FIG. 7 is an exemplary print settings setup screen as well as a substitute settings presenting screen. As shown in FIG. 7, the substitute settings presenting screen is popped up in a superimposed manner on the print settings setup screen shown in FIG. 6. The substitute settings presenting screen indicates the recommended settings including B5 normal paper as the setting for the paper type field, simplex printing as the setting for the duplex/simplex field, and monochrome (save toner) printing as the setting for the color/monochrome field. To the right of each recommended setting, the reduction rate that is supposed to be attained if the setting is modified to the recommended setting is shown.

The substitute settings presenting screen also includes check boxes, one for each setting, on the left side of the settings provided as recommended settings, so the user is allowed to select from the displayed recommended settings. In addition, the substitute settings presenting screen includes a button indicating the letters "modify" and another button indicating the letters "close". If the "modify" button is pressed, the substitute settings presenting screen is closed and the print settings will be changed to the recommended settings in a manner that only the selected settings are changed among the displayed recommended settings. On the other hand, if the "close" button is pressed, the substitute settings presenting setup screen is closed without modifying any print settings.

Figure 8:
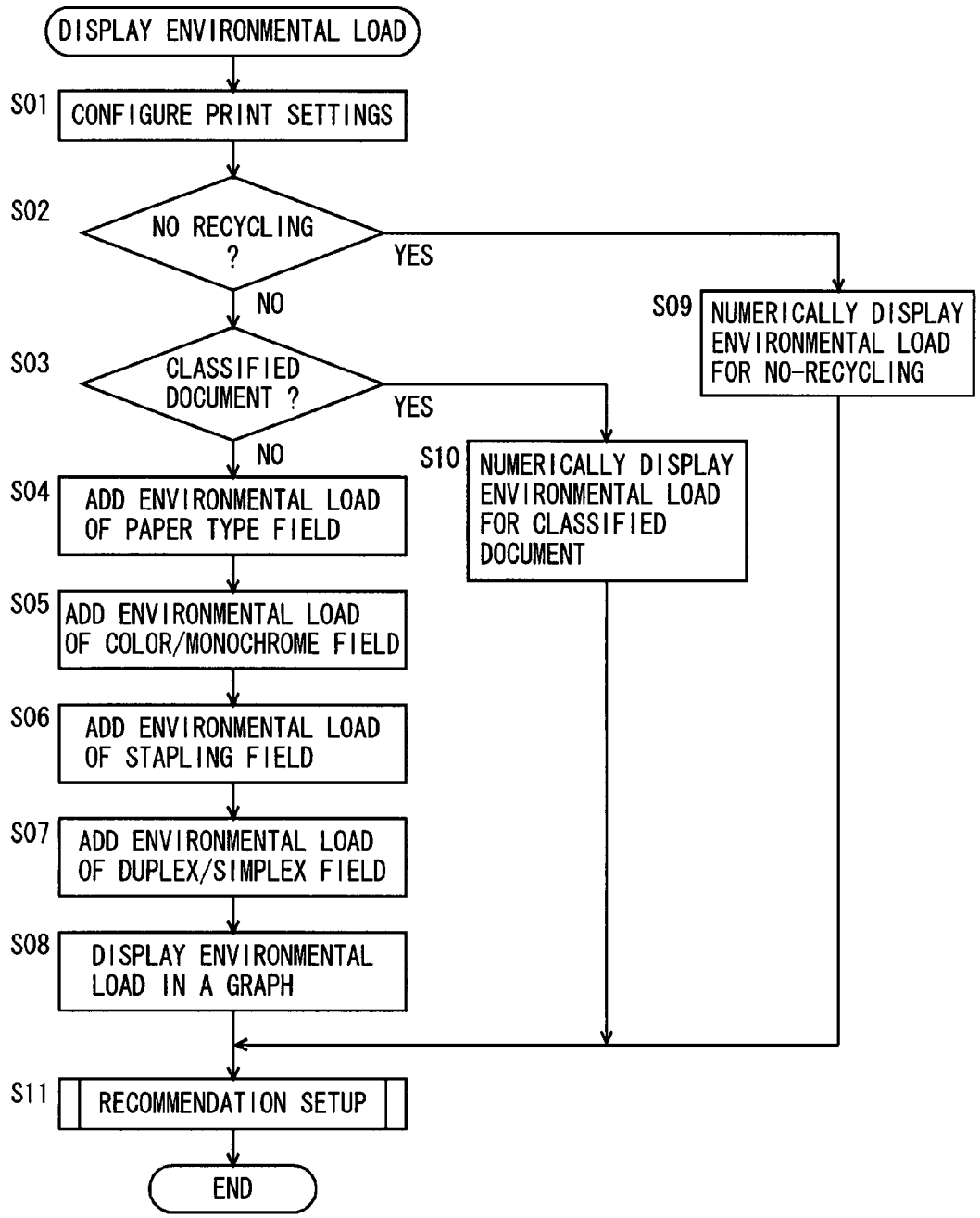
FIG. 8 is a flow chart illustrating an exemplary environmental load presenting procedure.

Referring to FIG. 8, there is shown a flow chart illustrating an exemplary environmental load displaying procedure. The environmental load displaying procedure is a process executed in CPU 111 of MFP 100 by running the print settings setup program. As shown in FIG. 8, CPU 111 receives the print settings setup (step S01). Then, it is determined whether or not "no recycle" is set in the recycle field of the received print settings (step S02). If "no recycle" has been set, the process proceeds to step S09. If "no recycle" has not been set, the process proceeds to step S03. In step S09, a coefficient of 100, which is previously defined with reference to reference data 61 corresponding to the "no-recycle" setting in the recycle field, is displayed on display portion 11A as the environmental load. As the print settings setup screen is already displayed on display portion 11A, the environmental load is indicated in part of it.

In step S03, it is determined whether or not "classified document" is set in the classified document field. If "classified document" has been set, the process proceeds to step S10. If "classified document" has not been set, the process proceeds to step S04. In step S10, a coefficient of 50, which is previously defined with reference to reference data 61 corresponding to the classified document setting in the classified document field, is displayed on display portion 11A as the environmental load. As the print settings setup screen is already displayed on display portion 11A, the environmental load is indicated in part of it.

In step S04, the environmental load indicated in the paper type field is added and the process proceeds to step S05. Specifically, the coefficient that is previously defined with reference to reference data 61 corresponding to the given setting in the paper type field of the print settings is added to the environmental load. Here, A4 size normal paper is set in the paper type field, so the coefficient of 5 is added to the environmental load, revising the environmental load to 5.

In step S05, the environmental load indicated in the color/monochrome field is added and the process proceeds to step S06. Specifically, the coefficient that is previously defined with reference to reference data 61 corresponding to the given setting in the color/monochrome field of the print settings is added to the environmental load. Here, monochrome printing is set in the color/monochrome field, so the coefficient of 1 is added to the environmental load, revising the environmental load to 6.

In step S06, the environmental load indicated in the stapling field is added and the process proceeds to step S07. Specifically, the coefficient that is previously defined with reference to reference data 61 corresponding to the given setting in the stapling field of the print settings is added to the environmental load. Here, "no stapling" is set in the stapling field, so the coefficient of 0 is added to the environmental load, leaving the environmental load as 6.

In step S07, the environmental load indicated in the duplex/simplex field is added and the process proceeds to step S08. Specifically, the coefficient that is previously defined with reference to reference data 61 corresponding to the given setting in the duplex/simplex field of the print settings is added to the environmental load. Here, the duplex printing is set in the duplex/simplex field, the coefficient of 2 is added to the environmental load, revising the environmental load to 8.

In step S08, the environmental load is represented in a bar graph on display portion 11A. The environmental load itself may be plotted. In this example, however, the percentage (28%) of the environmental load (8) relative to the reference environmental load (29) is calculated and represented in a graph. By showing the percentage of the environmental load relative to the reference environmental load that makes the maximum environmental load, rather than the environmental load itself, the user may easily judge whether or not the given environmental load is high.

Figure 9:
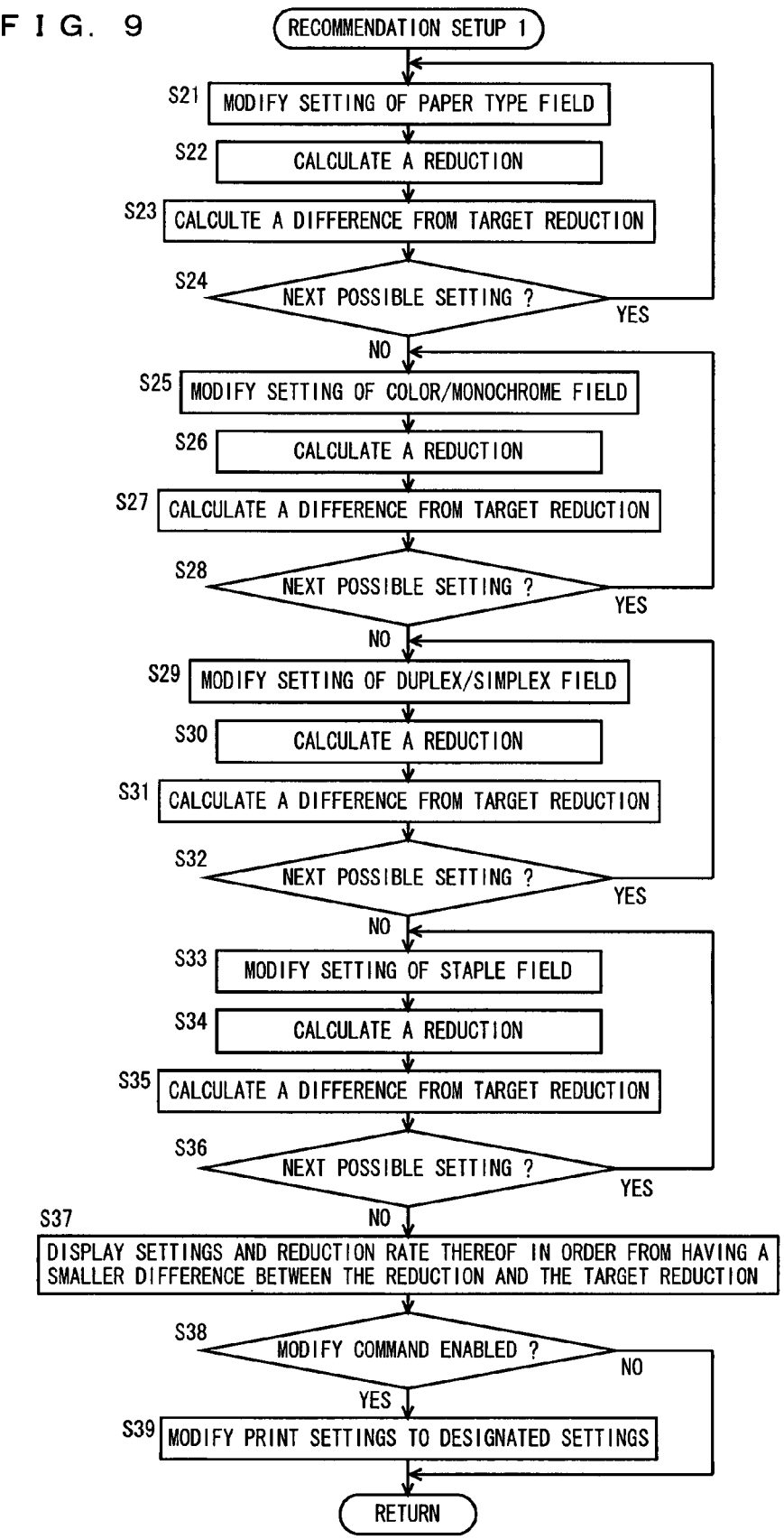
FIG. 9 is a flow chart illustrating an exemplary recommendation setup procedure.

Next, the recommendation setup procedure will be carried out. Referring to FIG. 9, there is shown a flow chart illustrating an exemplary recommendation setup procedure. As shown in FIG. 9, CPU 111 modifies the setting in the paper type field to another setting (step S21). Then, its reduction on the environmental load is calculated (step S22). As A4 size normal paper has been set in the paper type field of the print settings, the coefficient defined in the reference data corresponding to the given possible setting for the paper type field is acquired from the reference data. Then, the reduction of the environmental load is calculated from the acquired coefficient and the coefficient of 5 corresponding to the A4 size normal paper setting for the paper type field. For example, if the setting for the paper type field is changed to A3 size normal paper, the reduction of the environmental load will be +5, for the coefficient of 10 is defined corresponding to the setting of A3 size normal paper. In step S23, a difference between the obtained reduction and a target reduction of the environmental load is calculated. The target reduction is calculated according to the reduction rate relative to the reference environmental load. The reference environmental load is determined by the print settings that make the maximum environmental load, which is set to 29 here. The reduction rate is predetermined and set to 10% here. Therefore, the target reduction of the environmental load is 2.9. In step S24, it is determined whether or not there is yet another setting for which the reduction has not been calculated among the possible settings for the paper type field. If such a setting is present, the process returns to step S21, otherwise the process proceeds to step S25. Namely, the reduction is calculated for every possible setting for the paper type field.

In step S25, the setting for the color/monochrome field is modified to another setting. Then, its reduction on the environmental load is calculated (step S26). As the monochrome printing is set in the color/monochrome field of the print settings, the coefficient defined in the reference data corresponding to the given possible setting for the color/monochrome field will be acquired from the reference data. Then, the reduction of the environmental load is calculated from the acquired coefficient and the coefficient of 1 corresponding to the monochrome setting for the color/monochrome field. For example, if the setting for the color/monochrome field is changed to the color setting, the reduction of the environmental load will be +1, for the coefficient of 2 is defined corresponding to the setting of color printing. In step S27, a difference between the obtained reduction and a target reduction of the environmental load is calculated. In the next step S28, it is determined whether or not there is yet another setting for which the reduction has not been calculated among the possible settings for the color/monochrome field. If such a setting is present, the process returns to step S25, otherwise the process proceeds to step S29. Namely, the reduction is calculated for every possible setting for the color/monochrome field.

In step S29, the setting for the duplex/simplex field is modified to another setting. Then, its reduction on the environmental load is calculated (step S30). As the duplex printing is set in the duplex/simplex field of the print settings, the coefficient defined in the reference data corresponding to the given possible setting for the duplex/simplex field will be acquired from the reference data. Then, the reduction of the environmental load is calculated from the acquired coefficient and the coefficient of 2 corresponding to the duplex setting for the duplex/simplex field. For example, if the setting for the duplex/simplex field is changed to the simplex setting, the reduction of the environmental load will be −1, for the coefficient of 1 is defined corresponding to the setting of simplex printing. In step S31, a difference between the obtained reduction and a target reduction of the environmental load is calculated. In the next step S32, it is determined whether or not there is yet another setting for which the reduction has not been calculated among the possible settings for the duplex/simplex field. If such a setting is present, the process returns to step S29, otherwise the process proceeds to step S33. Namely, the reduction is calculated for every possible setting for the duplex/simplex field.

In step S33, the setting for the stapling field is modified to another setting. Then, its reduction on the environmental load is calculated (step S34). As no stapling is set in the stapling field of the print settings, the coefficient defined in the reference data corresponding to the given possible setting for the stapling field will be acquired from the reference data. Then, the reduction of the environmental load is calculated from the acquired coefficient and the coefficient of 0 corresponding to the no stapling setting for the stapling field. For example, if the setting for the stapling field is changed to the stapling setting, the reduction of the environmental load will be +5, for the coefficient of 5 is defined corresponding to the stapling setting. In step S35, a difference between the obtained reduction and a target reduction of the environmental load is calculated. In the next step S36, it is determined whether or not there is yet another setting for which the reduction has not been calculated among the possible settings for the stapling field. If such a setting is present, the process returns to step S33, otherwise the process proceeds to step S37. Namely, the reduction is calculated for every possible setting for the stapling field.

In step S37, the settings and the accompanying reduction rates are displayed in order from having a smaller difference between the reduction and the target reduction. Then, it is determined whether or not the modify command is enabled (step S38) and, if the modify command is enabled, the process proceeds to step S39, otherwise the process returns to the environmental load displaying procedure. In step S39, the modified settings are set as the print settings. In a case where the possible settings are displayed for more than one fields in step S37 and only part of them are designated to be modified, the print settings in the designated fields will be modified. As a result, the print settings are changed to those having less environmental load, so the images may be formed in accordance with those less environmentally influential print settings.

Modified Embodiment

Figure 10:
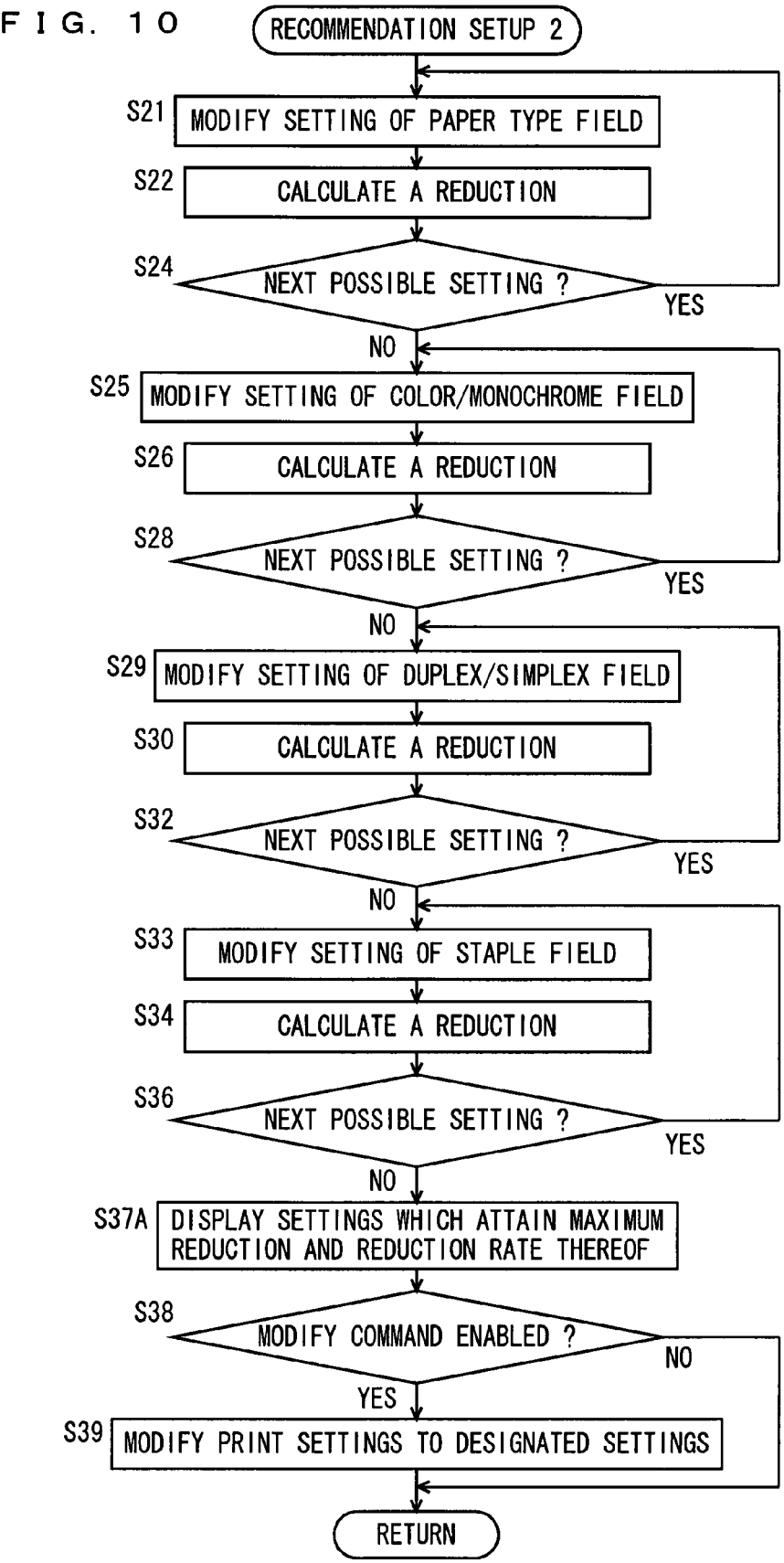
FIG. 10 is a flow chart illustrating another recommendation setup procedure according to a modified embodiment.

A modified embodiment of the recommendation setup procedure will be described below. Referring to FIG. 10, there is shown a flow chart illustrating an exemplary recommendation setup procedure according to a modified embodiment. This recommendation setup procedure is executed in step S11 of FIG. 8. The recommendation setup procedure as shown in FIG. 10 differs from the procedure shown in FIG. 9 in that the steps S23, S27, S31 and S35 are deleted and a modified step S37A is provided. Other steps of the procedure are similar to those of FIG. 9 and the description thereof will not be repeated. In step S37A, the settings each having the highest reduction are displayed for each field, together with the reduction rate thereof. The reduction rate is a percentage of the reduction on the environmental load for each setting relative to the reference environmental load. Alternatively, the settings each having the reduction within a predetermined range, rather than the highest reduction, may be displayed together with the reduction rate thereof.

Second Embodiment

In the first embodiment describe above, MFP 100 executes the environmental load displaying procedure. In a second embodiment, however, a computer connected to MFP 100 executes the environmental load displaying procedure that was carried out by MFP 100 in the first embodiment. A personal computer (PC) is a general type of computer with a printer driver program installed therein to control MFP 100.

Referring to FIG. 11, there is shown a block diagram illustrating an example of a hardware structure of a PC 200. As shown in FIG. 11, PC 200 includes a CPU 201, a ROM 203 which stores programs or the like to be executed by CPU 201, a RAM 205 which loads a program for execution and stores data while the program is executed, and a hard disc drive (HDD) 207 which serves as a large capacity memory, a card interface (I/F) 209 which mounts a flash memory 208, a communication I/F 211 which connects CPU 201 to a network, and an operating portion 219 which serves as an interface with the user.

CPU 201 loads the printer driver program, which is recorded in flash memory 208 inserted in card I/F 209 to control MFP 100, into RAM 205 and executes it. Instead of using the driver program recorded in the flash memory 208, CPU 201 may execute the program stored in HDD 207 by loading it into RAM 205. In this case, PC 200 may download the driver program from another computer connected to a network and stores it in HDD 207. The term "program" herein includes not only a program executable directly by CPU 201, but also other programs such as source-type programs, compressed programs and encrypted programs.

Operating portion 219 includes an input portion 219A and a display portion 219B. Input portion 219A is implemented by an input device, such as a keyboard, a mouse, and the like, for receiving inputs manipulated by the user of PC 200. Display portion 219B is implemented by a display device, such as a liquid crystal display, an organic electroluminescence display (EL) panel, a cathode-ray tube (CRT), and the like. Input portion 219A may include a pointing device, such as a touch panel.

Communication I/F 211 is a communication interface which connects PC 200 with a network or PSTN, to thereby enable PC 200 to establish communication with MFP 100 via the network, or other fax machines connected therewith via PSTN. Instead of using the network, PC 200 may be connected directly with MFP 100 via a serial or parallel interface. Any suitable interface applicable to the connecting configuration of PC 200 and MFP 100 may be used as communication I/F 211.

In the second embodiment, CPU 201 of PC 200 runs the printer driver program to execute the procedure as shown in FIGS. 8-10. The printer driver program includes the print settings setup program.

Referring to FIG. 12, there is shown an exemplary print settings setup screen which is displayed on display portion 219B of the PC. As shown in FIG. 12, the print settings setup screen includes an area for entering the print settings and, to its right, another area for showing a preview of the document and a bar graph which indicates a percentage of the environmental load corresponding to the determined print settings relative to the reference environmental load.

By reviewing the print settings setup screen, the user of PC 200 may judge whether or not the environmental load corresponding to the print settings, which MFP 100 is about to use in making printouts of the data, is high.

Figure 13:
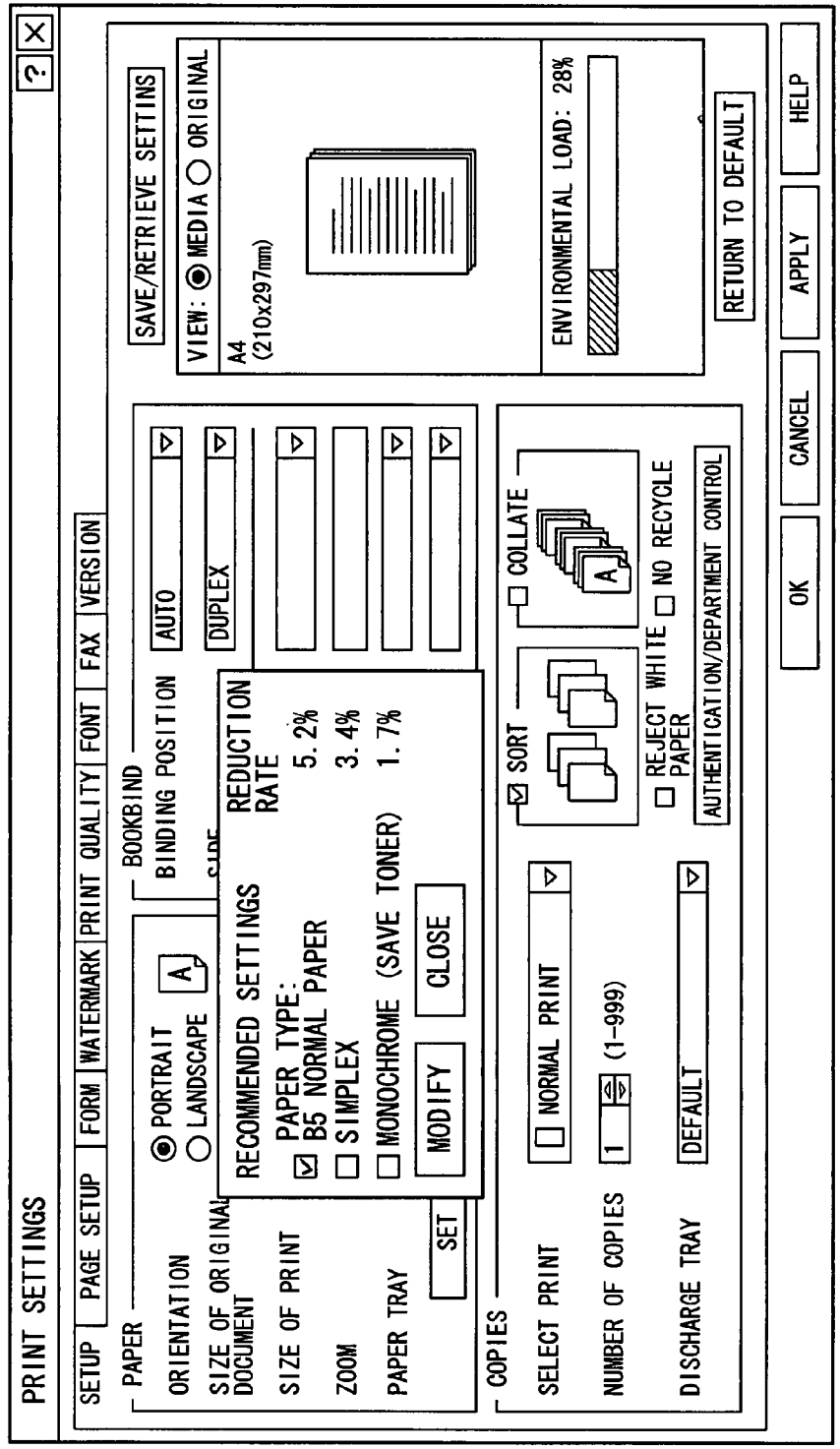
FIG. 13 is an example of a setup screen for configuring print settings, together with a screen for presenting substitute values, which are displayed on a display portion of the PC.

Referring to FIG. 13, there is shown an exemplary print settings setup screen which is displayed on display portion 219B of the PC, as well as a substitute settings presenting screen. As shown in FIG. 13, the substitute settings presenting screen is popped up in a superimposed manner on the print settings setup screen. The substitute settings presenting screen indicates recommended settings including B5 normal paper as the setting for the paper type field, simplex printing as the setting for the duplex/simplex field, and monochrome (toner save) printing as the setting for the color/monochrome field. To the right of each recommended setting, the reduction rate that is supposed to be attained if the setting is modified to the recommended setting is shown.

The substitute settings presenting screen also includes check boxes, one for each setting, on the left side of the settings provided as recommended settings, so the user is allowed to select from the displayed recommended settings. In addition, the substitute settings presenting screen includes a button indicating the letters "modify" and another button indicating the letters "close". If the "modify" button is pressed, the substitute settings presenting screen is closed and the print settings will be changed to the recommended settings only for the selected settings among the displayed recommended settings. On the other hand, if the "close" button is pressed, the substitute settings presenting screen is closed without modifying any print settings.

It should be noted that although MFP 100 or PC 200 have been described in the above embodiments for configuring the print settings, it is apparent that the present invention can be implemented as a method or a program to set print settings to cause MFP 100 and/or PC 200 to execute the procedures as illustrated in FIGS. 8-10.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   a print settings receiving portion to receive print settings to make a printout of data;
   an environmental load calculating portion to calculate an environmental load which indicates a degree of influence on the environment based on said received print settings;
   a display portion to display said calculated environmental load;
   a reduction calculating portion to modify each of a plurality of settings set in said received print settings into another possible setting, and calculate a reduction of said environmental load for each of said plurality of modified settings; and
   a presenting portion to present alternative substitute print settings which have a smaller environmental load than said calculated environmental load,
   wherein the presenting portion presents the plurality of modified settings in order from having the calculated reduction closer to a predetermined reduction.

2. An image forming apparatus according to claim 1, wherein said predetermined reduction is equal to a predetermined percentage of said reference environmental load calculated from said reference print settings.

3. An image forming apparatus according to claim 1, wherein said predetermined reduction is a predetermined percentage of said environmental load calculated from said received print settings.

4. A method for configuring print settings, comprising the steps of:
   receiving at an image forming apparatus print settings to make a printout of data;
   calculating an environmental load which indicates a degree of influence on the environment based on said received print settings;
   displaying said calculated environmental load;
   modifying each of a plurality of settings set in said received print settings into another possible setting, and calculating a reduction of said environmental load for each of said plurality of modified settings; and
   presenting alternative substitute print settings which have a smaller environmental load than said calculated environmental load,
   wherein the plurality of modified settings are presented in order from having the calculated reduction closer to a predetermined reduction.

5. A method for configuring print settings according to claim 4, wherein said predetermined reduction is equal to a predetermined percentage of said reference environmental load calculated from said reference print settings.

6. A method for configuring print settings according to claim 4, wherein said predetermined reduction is a predetermined percentage of said environmental load calculated from said received print settings.

7. A program embodied in a non-transitory computer readable recording medium to cause a computer to execute the steps of:
   receiving print settings to make a printout of data;
   calculating an environmental load which indicates a degree of influence on the environment based on said received print settings;
   displaying said calculated environmental load;
   modifying each of a plurality of settings set in said received print settings into another possible setting, and calculating a reduction of said environmental load for each of said plurality of modified settings; and
   presenting alternative substitute print settings which have a smaller environmental load than said calculated environmental load,
   wherein the plurality of modified settings are presented in order from having the calculated reduction closer to a predetermined reduction.

8. A program embodied in a non-transitory computer readable recording medium according to claim 7, wherein said predetermined reduction is equal to a predetermined percentage of said reference environmental load calculated from said reference print settings.

9. A program embodied in a non-transitory computer readable recording medium according to claim 7, wherein said predetermined reduction is a predetermined percentage of said environmental load calculated from said received print settings.

* * * * *